US012626266B1

(12) United States Patent
Wick et al.

(10) Patent No.: US 12,626,266 B1
(45) Date of Patent: May 12, 2026

(54) DETECTING AND REACTING TO UNSEEN LONG TERM EVENT IN DEMAND FORECASTING

(71) Applicant: Blue Yonder Group, Inc., Scottsdale, AZ (US)

(72) Inventors: Felix Christopher Wick, Thaleischweiler-Fröschen (DE); Sunny Kumar, Bangalore (IN); Trapti Singhal, Bangalore (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 223 days.

(21) Appl. No.: 17/835,706

(22) Filed: Jun. 8, 2022

Related U.S. Application Data

(60) Provisional application No. 63/212,911, filed on Jun. 21, 2021, provisional application No. 63/208,635, filed on Jun. 9, 2021.

(51) Int. Cl.
G06Q 30/0202 (2023.01)
G06Q 30/0201 (2023.01)

(52) U.S. Cl.
CPC ..... G06Q 30/0202 (2013.01); G06Q 30/0201 (2013.01)

(58) Field of Classification Search
CPC .......................................... G06Q 10/00–50/00
USPC .................................................. 705/7.11–7.42
See application file for complete search history.

(56) References Cited

U.S. PATENT DOCUMENTS

| | | | |
|---|---|---|---|
| 7,080,026 B2 * | 7/2006 | Singh ..................... | G06Q 10/06 |
| | | | 705/7.31 |
| 7,398,232 B2 * | 7/2008 | Renz ...................... | G06Q 10/06 |
| | | | 705/28 |
| 10,762,455 B1 * | 9/2020 | Sager ................... | G06Q 10/067 |
| 11,093,884 B2 * | 8/2021 | Devarakonda ....... | G06Q 10/087 |

(Continued)

OTHER PUBLICATIONS

Wick, Felix, Ulrich Kerzel, and Michael Feindt. "Cyclic boosting—an explainable supervised machine learning algorithm." 2019 18th IEEE International Conference On Machine Learning And Applications (ICMLA). IEEE, 2019. (Year: 2019).*

(Continued)

*Primary Examiner* — Alan S Miller
(74) *Attorney, Agent, or Firm* — Spencer Fane LLP; Steven J. Laureanti

(57) ABSTRACT

A system and method are disclosed for detecting and reacting to unseen events in demand forecasting, comprising preparing, by a server, data from a supply chain domain and entity to predict a demand, selecting features in the prepared data and training a machine learning model, generating a demand prediction with residual time series corrections, using the machine learning model, monitoring the demand prediction and data from the supply chain domain and entity to detect an occurrence of an unseen event; and in response to detecting the occurrence of the unseen event, revising the demand prediction by updating the machine learning model. The system and method further comprises detecting that a greater than threshold increase has occurred in a prediction of a target variable, and revising the demand prediction further comprises performing a second residual time series corrections that incorporates time information associated with the unseen event.

17 Claims, 4 Drawing Sheets

300

(56) References Cited

U.S. PATENT DOCUMENTS

| | | | |
|---|---|---|---|
| 2005/0251468 A1* | 11/2005 | Eder ................. | G06Q 30/0601 |
| | | | 705/35 |
| 2008/0065437 A1* | 3/2008 | Dybvig ................. | G06Q 10/06 |
| | | | 705/7.11 |
| 2009/0177520 A1* | 7/2009 | Bateni .................... | G06F 16/26 |
| | | | 705/7.31 |
| 2014/0058775 A1* | 2/2014 | Siig ........................ | G06Q 10/06 |
| | | | 705/7.12 |
| 2014/0279760 A1* | 9/2014 | Aliferis ................. | G06N 20/00 |
| | | | 706/12 |
| 2019/0130425 A1* | 5/2019 | Lei ..................... | G06Q 30/0201 |
| 2020/0210947 A1* | 7/2020 | Devarakonda ... | G06Q 10/06393 |
| 2021/0049532 A1* | 2/2021 | Smith ................... | G06N 20/00 |
| 2021/0097479 A1* | 4/2021 | Saffar ................ | G06Q 30/0637 |
| 2022/0277331 A1* | 9/2022 | Nash .................. | G06Q 30/0206 |
| 2022/0318711 A1* | 10/2022 | Recasens ......... | G06Q 10/06315 |
| 2022/0414590 A1* | 12/2022 | Melancon ........ | G06Q 10/06313 |

OTHER PUBLICATIONS

Jungtaek Kim et al., "AutoML Challenge: AutoML Framework Using Random Space Partitioning Optimizer," ICML 2016 AutoML Workshop, JMLR: Workshop and Conference Proceedings 1:Jan. 4, 2016.

Lisha Li et al., "Efficient Hyperparameter Optimization and Infinitely Many Armed Bandits," arXiv:1603.06560v1 [cs.LG] Mar. 21, 2016.

Konstantinos Nikolopoulos et al., "Forecasting and planning during a pandemic: COVID-19 growth rates, supply chain disruptions, and governmental decisions," European Journal of Operational Research, vol. 290, Issue 1, pp. 99-115, Apr. 1, 2021.

Andreas Otto, "Supply Chain Event Management: Three Perspectives," The International Journal of Logistics Management, vol. 14 No. 2, pp. 1-13, 2003.

* cited by examiner

300

START

302 GET CUSTOMER DATA

304 PREPARE DATA

306 FEATURE EXPLORATION & ENGINEERING

308 SELECT ML MODEL & HYPERPARAMETERS

310 GENERATE PREDICTIONS WITH RESIDUAL CORRECTIONS

312 PERFORM UNSEEN EVENT METHOD

314 FINAL PREDICTIONS

END

DETECTING AND REACTING TO UNSEEN LONG TERM EVENT IN DEMAND FORECASTING

CROSS REFERENCE TO RELATED APPLICATIONS

The present disclosure is related to that disclosed in the U.S. Provisional Application No. 63/212,911, filed Jun. 21, 2021, entitled "Detecting and Reacting to Unseen Long Term Event in Demand Forecasting," and U.S. Provisional Application No. 63/208,635, filed Jun. 9, 2021, entitled "Automated Supply Chain Demand Forecasting Pipeline." U.S. Provisional Application Nos. 63/212,911 and 63/208, 635 are assigned to the assignee of the present application. The present invention hereby claims priority under 35 U.S.C. § 119 (e) to U.S. Provisional Application Nos. 63/212,911 and 63/208,635.

TECHNICAL FIELD

The present disclosure relates generally to detecting and reacting to unseen, long-term events and, in particular, detecting and reacting to unseen, long-term events in supply chain demand forecasting utilizing machine learning models.

BACKGROUND

Events may comprise important features in supply chain demand forecasting and play important roles in supply chain model predictions and the training of machine learning models. For a particular product, events may be positive, such as sales increasing due to an exterior factor, or negative, such as sales decreasing due to, for example, extreme weather. Long-term events may last and affect the sales of one or more products for weeks or months at a time, whereas short-term events may only last for a day or even less. Events may also be classified as seen or unseen, wherein seen events have been seen earlier in history, but unseen events have not been seen and are detected only in model prediction scenarios, in which one or more machine learning models are asked to make demand predictions without having previously been trained to model and predict demand associated with an unseen event. Long-term, unseen events, such as, for example, the sudden arrival of the COVID-19 pandemic, may be harder to detect due to unknown characteristics and are therefore difficult to respond to, which is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
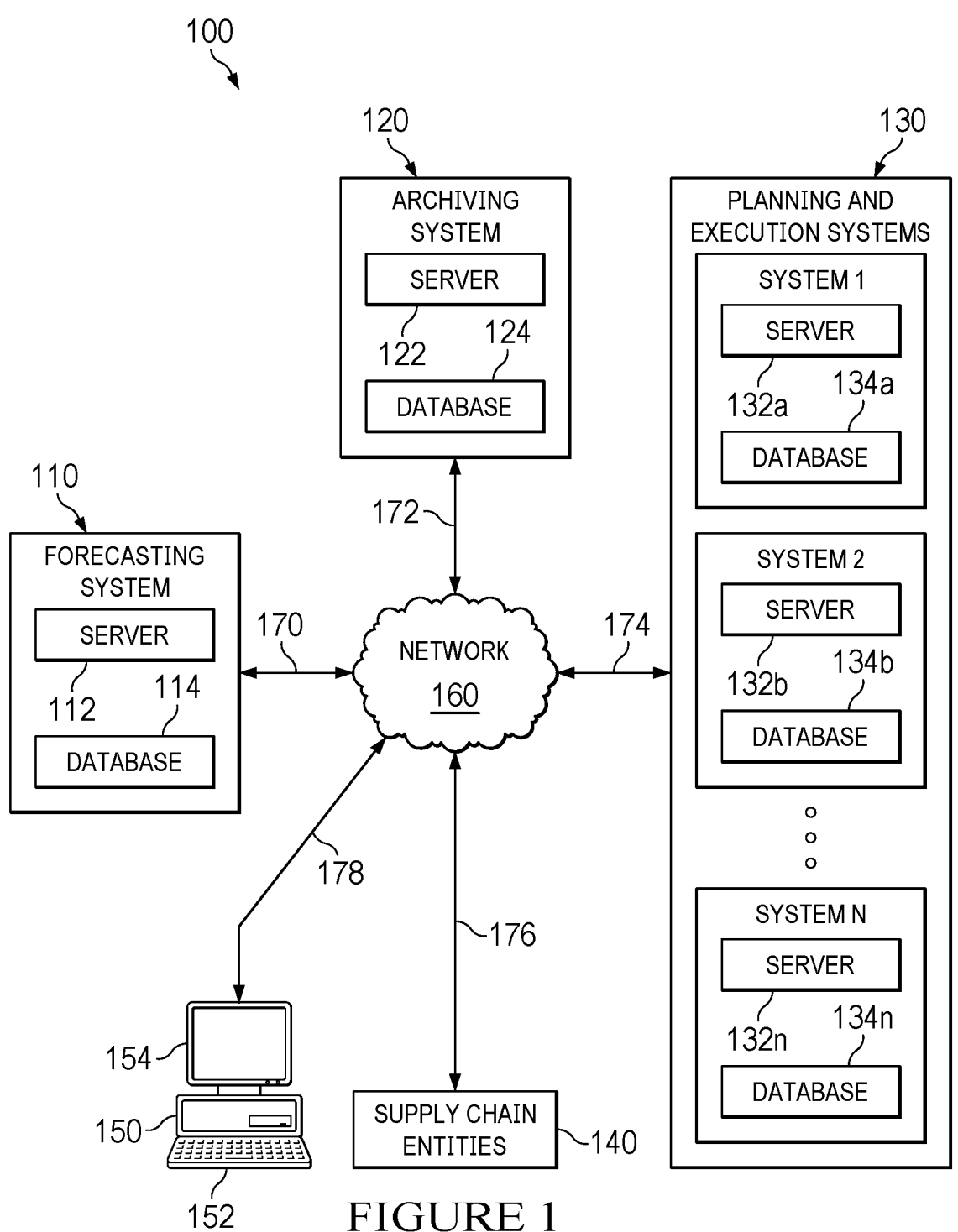
FIG. 1 illustrates a supply chain network, according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described in more detail below, embodiments of the following disclosure provide a demand forecasting system and method that detects starting and ending conditions for long-term unseen events and modifies demand predictions to incorporate the effects of the long-term unseen events into the accuracy of the demand predictions for the duration of the unseen event. Embodiments provide one or more machine learning models which may utilize one or more causal factors X to predict a volume Y (target or label). Having predicted a volume, the one or more machine learning models may then apply one or more residual time series corrections that incorporate differences between previous target and causal predictions time series data to correct, update, or modify the predicted volume to improve forecasting accuracy. Embodiments contemplate automatically detecting the starting and ending conditions for the unseen event and performing residual correction actions during the duration of the unseen event to increase the accuracy of demand predictions made during the duration of the unseen event.

FIG. 1 illustrates an exemplary supply chain network 100, in accordance with a first embodiment. Supply chain network 100 comprises forecasting system 110, archiving system 120, one or more planning and execution systems 130, one or more supply chain entities 140, computer 150, network 160, and communication links 170-178. Although a single forecasting system 110, a single archiving system 120, one or more planning and execution systems 130, one or more supply chain entities 140, a single computer 150, and a single network 160 are shown and described, embodiments contemplate any number of forecasting systems, archiving systems, one or more planning and execution systems, one or more supply chain entities, computers, or networks, according to particular needs.

In one embodiment, forecasting system 110 comprises server 112 and database 114. As explained in more detail below, forecasting system 110 uses a knowledge base and one or more machine learning models trained from historical data (such as, for example, historical sales data) to generate a prediction when data is applied to the one or more machine learning models. Embodiments may also automatically detect the starting and ending conditions for one or more unseen events of long-term duration which forecasting system 110 machine learning models have not previously been trained to model and may perform additional residual correction actions during the duration of the unseen events to increase the accuracy of demand predictions made during the duration of the unseen events. Embodiments of forecasting system 110 contemplate detecting starting and ending conditions for unseen events of unknown durations with customizable degrees of sensitivity. Embodiments may use selectable and separate trigger criteria to detect the starting and ending conditions of unseen events (for example, and in an embodiment, trigger criteria defining the start of an unseen event as a 10% decrease in product sales (i.e., for a negative event like COVID-19) for a particular product and defining the end of an unseen event as a 3% increase in product sales). Embodiments permit the classification of unseen events into wide-reaching global categories (such as the COVID-19 pandemic) and more local, transient categories (such as a local election or town-level news story), supporting accurate demand predictions via machine learning models. As an example only, and not by way of limitation, a constraint may be, that more than one unseen event cannot occur in parallel. Although, if one unseen event is concluded the next can be started. In addition, or as an alternative, an unseen event can occur with other known events as known events will be taken into the picture as features in modeling, as described in further detail below.

Forecasting system 110 may receive historical data and/or prepared data 240 from archiving system 120, one or more planning and execution systems 130, one or more supply chain entities 140, and/or computer 150 of supply chain network 100, as described in more detail below. In addition, server 112 comprises one or more modules that provide a user interface (UI) that displays visualizations identifying and quantifying data in the knowledge base, one or more machine learning predictions, and/or a contribution of external causal factors and/or autocorrelated lagged target and causal prediction time series data, which forecasting system 110 may apply to the machine learning causal predictions to correct recent trends.

Archiving system 120 of supply chain network 100 comprises server 122 and database 124. Although archiving system 120 is shown as comprising a single server 122 and a single database 124, embodiments contemplate any suitable number of servers 122 or databases 124 internal to or externally coupled with archiving system 120, according to particular needs. Server 122 of archiving system 120 may support one or more processes for receiving and storing data from forecasting system 110, one or more planning and execution systems 130, one or more supply chain entities 140, and/or one or more computers 150 of supply chain network 100, as described in more detail below. According to some embodiments, archiving system 120 comprises an archive of data received from one or more planning and execution systems 130, one or more supply chain entities 140, and/or one or more computers 150 of supply chain network 100. Archiving system 120 provides archived data to forecasting system 110 and/or one or more planning and execution systems 130 to, for example, train a machine learning model or utilize a trained machine learning model to make predictions. Server 122 may store received data in database 124. Database 124 of archiving system 120 may comprise one or more databases 124 or other data storage arrangements at one or more locations, local to, or remote from, server 122.

According to an embodiment, one or more planning and execution systems 130 comprise server 132 and database 134. Supply chain planning and execution is typically performed by several distinct and dissimilar processes, including, for example, demand planning, production planning, supply planning, distribution planning, execution, transportation management, warehouse management, fulfilment, procurement, and the like. Server 132 of one or more planning and execution systems 130 comprises one or more modules (such as, for example, a planner, a solver, a modeler, and/or an engine) for performing actions of one or more planning and execution processes. Server 132 stores and retrieves data from database 134 or from one or more locations in supply chain network 100. In addition, one or more planning and execution systems 130 operate on one or more computers 150 that are integral to or separate from the hardware and/or software that support archiving system 120 and one or more supply chain entities 140.

As shown in FIG. 1, supply chain network 100 comprising forecasting system 110, archiving system 120, one or more planning and execution systems 130, and one or more supply chain entities 140 may operate on one or more computers 150 that are integral to or separate from the hardware and/or software that support forecasting system 110, archiving system 120, one or more planning and execution systems 130, and one or more supply chain entities 140. One or more computers 150 may include any suitable input device 152, such as a keypad, mouse, touch screen, microphone, or other device to input information. Output device 154 may convey information associated with the operation of supply chain network 100, including digital or analog data, visual information, or audio information. One or more computers 150 may include fixed or removable computer-readable storage media, including a non-transitory computer readable medium, magnetic computer disks, flash drives, CD-ROM, in-memory device or other suitable media to receive output from and provide input to supply chain network 100.

One or more computers 150 may include one or more processors 156 and associated memory to execute instructions and manipulate information according to the operation of supply chain network 100 and any of the methods described herein. In addition, or as an alternative, embodiments contemplate executing the instructions on one or more computers 150 that cause one or more computers 150 to perform functions of the method. An apparatus implementing special purpose logic circuitry, for example, one or more field programmable gate arrays (FPGA) or application-specific integrated circuits (ASIC), may perform functions of the methods described herein. Further examples may also include articles of manufacture including tangible non-transitory computer-readable media that have computer-readable instructions encoded thereon, and the instructions may comprise instructions to perform functions of the methods described herein.

In addition, or as an alternative, supply chain network 100 may comprise a cloud-based computing system having processing and storage devices at one or more locations, local to, or remote from forecasting system 110, archiving system 120, one or more planning and execution systems 130, and one or more supply chain entities 140. In addition, each of one or more computers 150 may be a workstation, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with forecasting system 110 and archiving system 120. These one or more users may include, for example, an "administrator" handling machine learning model administration of cloud computing systems, and/or one or more related tasks within supply chain network 100. In the same or another embodiment, one or more users may be associated with one or more planning and execution systems 130, and one or more supply chain entities 140.

One or more supply chain entities 140 may include, for example, one or more retailers, distribution centers, manufacturers, suppliers, customers, and/or similar business entities configured to manufacture, order, transport, or sell one or more products. Retailers may comprise any online or brick-and-mortar store that sells one or more products to one or more customers. Manufacturers may be any suitable entity that manufactures at least one product, which may be sold by one or more retailers. Suppliers may be any suitable entity that offers to sell or otherwise provides one or more items (i.e., materials, components, or products) to one or more manufacturers. Although one example of supply chain network 100 is shown and described, embodiments contemplate any configuration of supply chain network 100, without departing from the scope described herein.

In one embodiment, forecasting system 110, archiving system 120, one or more planning and execution systems 130, supply chain entities 140, and computer 150 may be coupled with network 160 using one or more communication links 170-178, which may be any wireline, wireless, or other link suitable to support data communications between forecasting system 110, archiving system 120, planning and execution system 130, supply chain entities 140, computer 150, and network 160 during operation of supply chain network 100. Although communication links 170-178 are shown as generally coupling forecasting system 110, archiving system 120, one or more planning and execution systems 130, one or more supply chain entities 140, and computer 150 to network 160, any of forecasting system 110, archiving system 120, one or more planning and execution systems 130, one or more supply chain entities 140, and computer 150 may communicate directly with each other, according to particular needs.

In another embodiment, network 160 includes the Internet and any appropriate local area networks (LANs), metropolitan area networks (MANs), or wide area networks (WANs) coupling forecasting system 110, archiving system 120, one or more planning and execution systems 130, one or more supply chain entities 140, and computer 150. For example, data may be maintained locally to, or externally of, forecasting system 110, archiving system 120, one or more planning and execution systems 130, one or more supply chain entities 140, and one or more computers 150 and made available to one or more associated users of forecasting system 110, archiving system 120, one or more planning and execution systems 130, one or more supply chain entities 140, and one or more computers 150 using network 160 or in any other appropriate manner. For example, data may be maintained in a cloud database at one or more locations external to forecasting system 110, archiving system 120, one or more planning and execution systems 130, one or more supply chain entities 140, and one or more computers 150 and made available to one or more associated users of forecasting system 110, archiving system 120, one or more planning and execution systems 130, one or more supply chain entities 140, and one or more computers 150 using the cloud or in any other appropriate manner. Those skilled in the art will recognize that the complete structure and operation of network 160 and other components within supply chain network 100 are not depicted or described. Embodiments may be employed in conjunction with known communications networks and other components.

Although the disclosed systems and methods are described below primarily in connection with retail demand forecasting solely for the sake of clarity, the systems and methods herein are applicable to other supply chain entities 140, as disclosed above.

Figure 2:
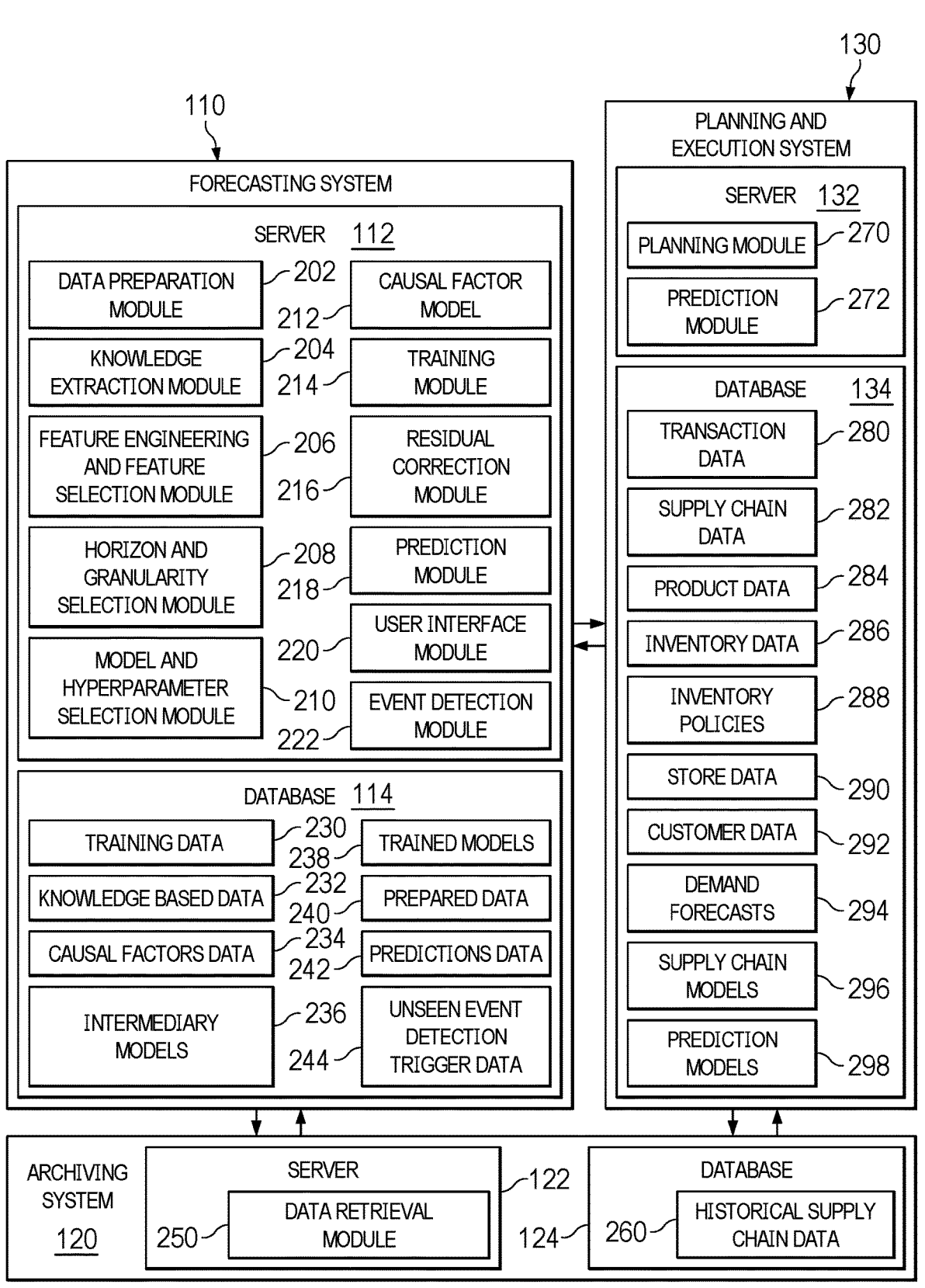
FIG. 2 illustrates the forecasting system, the archiving system, and the planning and execution system of FIG. 1 in greater detail, according to an embodiment.

FIG. 2 illustrates forecasting system 110, archiving system 120, and planning and execution system 130 of FIG. 1 in greater detail, in accordance with an embodiment. Forecasting system 110 may comprise server 112 and database 114, as disclosed above. Although forecasting system 110 is shown as comprising a single server 112 and a single database 114, embodiments contemplate any suitable number of servers 112 or databases 114 internal to or externally coupled with forecasting system 110, according to particular needs.

Server 112 of forecasting system 110 comprises data preparation module 202, knowledge extraction module 204, feature engineering and feature selection module 206, horizon and granularity selection module 208, model and hyperparameter selection module 210, causal factor model 212, training module 214, residual correction module 216, prediction module 218, user interface module 220, and event detection module 222. Although server 112 is shown and described as comprising a single data preparation module 202, knowledge extraction module 204, feature engineering and feature selection module 206, horizon and granularity selection module 208, model and hyperparameter selection module 210, causal factor model 212, training module 214, residual correction module 216, prediction module 218, user interface module 220, and event detection module 222, embodiments contemplate any suitable number or combination of these located at one or more locations, local to, or remote from forecasting system 110, such as on multiple servers or computers at one or more locations in supply chain network 100.

Database 114 of forecasting system 110 may comprise one or more databases or other data storage arrangements at one or more locations, local to, or remote from, server 112. In an embodiment, database 114 of forecasting system 110 comprises training data 230, knowledge base data 232, causal factors data 234, intermediary models 236, trained models 238, prepared data 240, predictions data 242, and unseen event detection trigger data 244. Although database 114 of forecasting system 110 is shown and described as comprising training data 230, knowledge base data 232, causal factors data 234, intermediary models 236, trained models 238, prepared data 240, predictions data 242, and unseen event detection trigger data 244, embodiments contemplate any suitable number or combination of these, located at one or more locations, local to, or remote from, forecasting system 110 according to particular needs.

In one embodiment, data preparation module 202 of forecasting system 110 receives data from archiving system 120, supply chain planning and execution systems 130, one or more supply chain entities 140, one or more computers 150, or one or more data storage locations local to, or remote from, supply chain network 100 and forecasting system 110, and prepares the data for use in training causal factor model 212 and generating predictions data 242 from one or more trained models 238. Data preparation module 202 prepares received data for use in training and prediction by checking received data for errors and transforming the received data. Data preparation module 202 may check received data for errors in the range, sign, and/or value and use statistical analysis to check the quality or the correctness of the data. Data preparation module 202 may also normalize data, drop or delete null values, corrupted values, or blank values, and/or may otherwise prepare the data for use in forecasting system 110. According to embodiments, data preparation module 202 transforms the received data to normalize, aggregate, and/or rescale the data to allow direct comparison of received data from different planning and execution systems 130. Having prepared data, data preparation module 202 stores the prepared data in prepared data 240 of database 114.

Knowledge extraction module 204 may extract or update the data stored in knowledge base data 232 as forecasting system 110 selects supply chain domain and entity-specific features list, granularity, and horizon data, and/or generates one or more machine learning model predictions, stored in predictions data 242. In an embodiment, knowledge extraction module 204 may access supply chain domain-specific and entity-specific features list data, granularity data, and/or horizon data (stored in knowledge base data 232), and may import supply chain domain-specific and entity-specific features list data, granularity data, and/or horizon data into prepared data 240, as described in greater detail below.

Feature engineering and feature selection module 206 may access prepared data 240 and select one or more features to generate one or more demand predictions using the actions of the method. Feature engineering and feature selection module 206 may store the selected one or more domain and entity specific features in prepared data 240. Horizon and granularity selection module 208 may access prepared data 240 and select one or more horizons and/or levels of granularity 504 with which to generate one or more demand predictions. Horizon and granularity selection module 208 may store the selected one or more horizons and/or levels of granularity 504 in prepared data 240.

Model and hyperparameter selection module 210 may access prepared data 240 and may choose, based on prepared data 240, one or more machine learning models and/or hyperparameters (parameters that control machine learning process) with which prediction module 218 will generate one or more predictions, as described in greater detail below. In an embodiment, model and hyperparameter selection module 210 attempts to increase the accuracy of the model on training data 230 by using the right parameters which may be specific to algorithms or specific to the model process.

Causal factor model 212 comprises a model used by training module 214 to generate intermediary models 236 by identifying causal factors data 234. In an embodiment, by identifying causal factors, causal factor model 212 may identify the causal factors with improved speed and/or accuracy. According to one embodiment, causal factor model 212 is trained from training data 230 to predict a volume Y (target or label) from a set of identified causal factors X that describe the strength of each factor variable contributing to the intermediary model prediction. In other embodiments, causal factor model 212 is trained in a common optimization process from all considered individual time series data of item-store combinations stored in historical supply chain data 250 of archiving system 120 database 124.

Training module 214 may use training data 230 to train causal factor model 212 by identifying causal factors and generating intermediary models 236. Training module 214 may use causal factor model 212 to calculate causal factors and the effects of causal factors from training data 230.

Residual correction module 216 uses training data 230 and intermediary models 236 to train causal factor model 212 by applying individual (for example, in an embodiment, single item-store combinations) residual time series corrections using lagged target and during training time, predicted time series data, stored in training data 230, to the exponential smoothing, deviation correction, recent trend capture, and/or any other post-causal factor technique that incorporates time series data to apply target residual correction). Lagged target time series data contains target time series with lag equals to horizons provided by the customer or extracted from knowledge base data. By way of example only and not by way of limitation, a monthly time series may have a lag or horizon equal to two. Continuing with this non-limiting example, when the lag/horizon is equal to two for this monthly time series and the forecasting system 130 is forecasting sales for March 2021 for an example Product X at Location A, residual correction module 216 uses sales time series data of Product X at location A from January 2021 to correct the residuals. According to embodiments, residual correction module 216 may generate one or more trained models 238 that apply residual time series corrections using target time series data to correct, update, or modify the target variable output of one or more intermediary models 236. In an embodiment, residual correction module 216 generates different models that apply separate residual time series corrections for different time horizons. Residual correction module 216 calculates and/or selects hyperparameters suitable for the technique and time of the prediction. By way of example only and not by way of limitation, residual correction module 216 may calculate and/or select the value of alpha when using an exponential moving average technique. By way of further examples only and further not by way of limitation, implementation of residual correction (with target and predictions referring to, in this example, individual item-store combinations) may include but are not limited to (1) corrected prediction at $time_t$=Exponential Moving Average $(target)_{till\ time\ t-h}$/Exponential Moving Average (causal prediction)$_{till\ time\ t-h}$*causal prediction$_{at\ time\ t}$, and (2) deep learning techniques (such as, for example, a recurrent neural network) on residuals. In the foregoing non-limiting example, t is the timestamp at which actuals or predictions are taken and h is the horizon. For example, and as illustrated by TABLE 1, for an example product P1 at example location L1 (comprising the example item-store combination of P1-L1) and comprising a horizon, h, equal to one, residual correction has been implemented on predictions as follows:

TABLE 1

| Date | Product | Location | Actual | Predicted | Correction Factor | Residual Correction |
|------|---------|----------|--------|-----------|-------------------|---------------------|
| Jan 1 | P1 | L1 | 70 | 72 | NA | NA |
| Feb 1 | P1 | L1 | 130 | 140 | 0.97 | 136.11 |
| Mar 1 | P1 | L1 | 80 | 90 | 0.94 | 84.38 |
| Apr 1 | P1 | LI | 120 | 116 | 0.91 | 105.90 |
| Jun 1 | P1 | L1 | 80 | 83 | 0.98 | 81.48 |
| Jul 1 | P1 | L1 | 120 | 125 | 0.97 | 121.71 |

Prediction module 218 applies samples of prepared data 240 to one or more machine learning models stored in trained models 238 to generate predictions. By way of further explanation only and not by way of limitation, prediction module 218 predicts a volume Y (target or label) from a set of causal factors X along with (1) causal factors strengths that describe the strength of each causal factor variable contributing to the predicted volume, and (2) residual time series corrections using autocorrelated lagged target and causal time series data. According to some embodiments, prediction module 218 generates predictions at daily intervals. However, embodiments contemplate longer and shorter prediction phases that may be performed, for example, monthly, weekly, twice a week, twice a day, hourly, or the like.

User interface module 220 of forecasting system 110 generates and displays a user interface (UI), such as, for an example, a graphical user interface (GUI), that displays one or more interactive visualizations identifying and quantifying data in the knowledge base, the one or more machine learning predictions, and/or the contribution of external causal factors and/or autocorrelated lagged target and causal time series data to the machine learning predictions. According to embodiments, user interface module 220 displays a GUI comprising interactive graphical elements for selecting one or more supply chain domains, entities, features, horizons, levels of granularity, items, stores, or products in a specified time interval and, in response to the selection, displaying one or more graphical elements identifying one or more causal factors and the relative importance of the retrieved one or more causal factors, as well as residual time series corrections, to the demand prediction. Further, user interface module 220 may display interactive graphical elements that provide for modification of future states of the one or more identified causal factors and/or residual time series corrections, and, in response to modifying the one or more future states of the causal factors and/or residual time series corrections, modifying input values to represent a future scenario corresponding to the modified futures states of the one or more causal factors and/or residual time series corrections. For example, embodiments of user interface module 220 provide "what if" scenario modeling and prediction for modifying a future weather variable to identify and calculate the change in a prediction based on a change in weather using historical weather data and related historical supply chain data 250. As an example only and not by way of limitation, demand for plywood changes dramatically when a hurricane is predicted to strike a particular region. To predict the influence of a hurricane on sales, forecasting system 110 modifies input values to represent a future scenario modeled by the "what if" scenario. In other embodiments, forecasting system 110 predicts, as an example only and not by way of limitation, the influence of one or more upcoming or potential promotions. A proper distinction between causal factors and lagged target information is crucial for what if scenarios.

Event detection module 222 may utilize one or more unseen event detection triggers to detect the occurrence and end of unseen event of long-term, as described in greater detail below.

Training data 230 of forecasting system 110 database 114 comprises a selection of one or more periods of historical supply chain data 250 aggregated or disaggregated at various levels of granularity and presented to causal factor model 212 to generate intermediary models 236 and trained models 238. According to one embodiment, training data 230 comprises historic sales patterns, prices, promotions, weather conditions, and other factors influencing future demand of a particular item sold in a given store on a specific day. Training data 230 may also comprise time series data, such as, for example, a list of products sold at various locations or retailers at recorded dates and times. As described in more detail below, forecasting system 110 may receive training data 230 from archiving system 120, one or supply chain planning and execution systems 130, one or more supply chain entities 140, computer 150, or one or more data storage locations local to, or remote from, supply chain network 100 and forecasting system 110.

Knowledge base data 232 may store data, including but not limited to the supply chain domain and entity specific features data, levels of granularity, and horizon data, and/or other data accumulated and stored in knowledge base data 232 during the process of generating one or more demand predictions. In an embodiment, forecasting system 110 may continuously update knowledge base data 232 as forecasting system 110 generates one or more demand predictions. Forecasting system 110 may also use data stored in knowledge base data 232 and automatically select supply chain domain and entity specific features, horizons and levels of granularity and/or other data and/or models while executing the activities of the method, as described in greater detail below.

Causal factors data 234 comprises one or more causal factors identified by training module 214 in the process of training causal factor model 212. For the purposes of training causal factor model 212, causal factors represent exterior factors that may positively or negatively influence the sales of one or more items over one or more time periods and/or on one or more dates. As an example only and not by way of limitation, a causal factor may comprise a "Black Friday" sales day, on which, traditionally, American shoppers predictably shop and spend at a far higher rate than other sales days. Training module 214 may identify the "Black Friday" sales pattern in training data 230 by identifying that the day after "Thanksgiving Day" results in very high customer shopping and spending rates and may store the "Black Friday" sales pattern as a causal factor in causal factors data 234.

According to embodiments, causal factors may comprise, for example, any exterior factor that positively or negatively influences the sales of one or more items over one or more time periods, such as, for example, sales promotions, sales coupons, sales days, sales bundles, traditional heavy shopping days (such as, for example, "Black Friday"), weather events (such as, for example, a heavy storm raining out roads, decreasing customer traffic and subsequent sales), political events (such as, for example, tax refunds increasing disposable customer income, or trade tariffs increasing the price of imported goods), and/or the day of the week, or other factors influencing sales. In an embodiment, causal factors may occur on the day of the target volume to be predicted. For example, in an embodiment in which a trained model predicts, on Nov. 1, 2019, a sales volume Y that will occur on "Black Friday", Nov. 29, 2019, the trained model may utilize the "Black Friday" causal factor to predict sales on Nov. 29, 2019, even though the "Black Friday" causal factor has not yet occurred on the Nov. 1, 2019 date of the prediction.

Intermediary models 236 comprise one or more causal factor models 212 trained from training data 230 to predict volumes (such as, for example, future sales or orders) along with causal factors and the contributing strength of each causal factor variable in contributing to the prediction. Trained models 238 comprise one or more causal factor models 212 trained by residual correction module 216 to execute the additional activity of applying residual time series corrections using autocorrelated lagged target and predicted time series data to the causal factor-based predictions. Trained models 238 may also store one or more hyperparameters that control machine learning processes, such as, for example, one or more values of alpha in the exponential moving average technique of residual correction.

Prepared data 240 comprises data used to generate a prediction from trained models 238. According to embodiments, prepared data 240 comprises current sales patterns, prices, promotions, weather conditions, and other current factors influencing demand of a particular item sold in a given store on a specific day. Prepared data 240 may comprise one or more segments of training data 230 and/or knowledge base data, one or more selected features, one or more selected domains and/or supply chain entities 140, one or more selected horizons and/or levels of granularity, or any other data forecasting system 110 may use to predict demands and generate forecasts.

Predictions data 242 comprises a retail volume, such as, for example, a sales volume, demand volume, and the like, as well as the contributions from one or more causal factors used by prediction module 218 to generate the retail volume prediction. According to one embodiment, predictions data 242 comprises a predicted volume Y (target or label) predicted from a set of causal factors X along with residual time series corrections using autocorrelated target and predicted time series data.

Unseen event detection trigger data 244 may store one or more conditions, triggers, alerts, threshold values, and/or other data with respect to any component of supply chain network 100, supply chain entities 140, and/or the target variable predictions that indicate unseen event has occurred or concluded.

As disclosed above, archiving system 120 comprises server 122 and database 124. Although archiving system 120 is shown as comprising a single server 122 and a single database 124, embodiments contemplate any suitable number of servers 122 or databases 124 internal to or externally coupled with archiving system 120.

Server 122 of archiving system 120 comprises data retrieval module 250. Although server 122 is shown and described as comprising a single data retrieval module 250, embodiments contemplate any suitable number or combination of data retrieval modules 250 located at one or more locations, local to, or remote from archiving system 120, such as on multiple servers 122 or computers 150 at one or more locations in supply chain network 100.

In one embodiment, data retrieval module 250 of archiving system 120 receives historical supply chain data 250 from one or more supply chain planning and execution systems 130 and one or more supply chain entities 140 the received historical supply chain data 250 in archiving system 120 database 124. According to one embodiment, data retrieval module 250 of forecasting system 110 may prepare historical supply chain data 250 for use as training data 230 of forecasting system 110 by checking historical supply chain data 250 for errors and transforming historical supply chain data 250 to normalize, aggregate, and/or rescale historical supply chain data 250 to allow direct comparison of data received from different planning and execution systems 130, one or more supply chain entities 140, and/or one or more other locations local to, or remote from, archiving system 120. According to embodiments, data retrieval module 250 receives data from one or more sources external to supply chain network 100, such as, for example, weather data, special events data, social media data, calendar data, and the like and stores the received data as historical supply chain data 250.

Database 124 of archiving system 120 may comprise one or more databases or other data storage arrangements at one or more locations, local to, or remote from, server 122. Database 124 of archiving system 120 comprises, for example, historical supply chain data 250. Although database 124 of archiving system 120 is shown and described as comprising historical supply chain data 250, embodiments contemplate any suitable number or combination of data, located at one or more locations, local to, or remote from, archiving system 120, according to particular needs.

Historical supply chain data 250 comprises historical data received from forecasting system 110, archiving system 120, one or more supply chain planning and execution systems 130, one or more supply chain entities 140, and/or computer 150. Historical supply chain data 250 may comprise, for example, sales data, product information data, location information data, promotion data, weather data, special events data, social media data, calendar data, and the like. In an embodiment, historical supply chain data 250 may comprise, for example, historic sales patterns, prices, promotions, weather conditions and other factors influencing future demand of the number of one or more items sold in one or more stores over a time period, such as, for example, one or more days, weeks, months, years, including, for example, a day of the week, a day of the month, a day of the year, week of the month, week of the year, month of the year, special events, paydays, and the like.

As disclosed above, planning and execution system 130 comprises server 132 and database 134. Although planning and execution system 130 is shown as comprising a single server 132 and a single database 134, embodiments contemplate any suitable number of servers 132 or databases 134 internal to or externally coupled with planning and execution system 130.

Server 132 of planning and execution system 130 comprises planning module 270 and prediction module 272. Although server 132 is shown and described as comprising a single planning module 270 and a single prediction module 272, embodiments contemplate any suitable number or combination of planning modules 270 and prediction modules 272 located at one or more locations, local to, or remote from planning and execution system 130, such as on multiple servers or computers at one or more locations in supply chain network 100.

Database 134 of planning and execution system 130 may comprise one or more databases or other data storage arrangements at one or more locations, local to, or remote from, server 132. Database 134 of planning and execution system 130 comprises, for example, transaction data 280, supply chain data 282, product data 284, inventory data 286, inventory policies 288, store data 290, customer data 292, demand forecasts 294, supply chain models 296, and prediction models 298. Although database 134 of planning and execution system 130 is shown and described as comprising transaction data 280, supply chain data 282, product data 284, inventory data 286, inventory policies 288, store data 290, customer data 292, demand forecasts 294, supply chain models 296, and prediction models 298, embodiments contemplate any suitable number or combination of data, located at one or more locations, local to, or remote from, supply chain planning and execution systems 130, according to particular needs.

Planning module 270 of planning and execution system 130 works in connection with prediction module 218 to generate a plan based on one or more predicted retail volumes, classifications, or other predictions. By way of example and not of limitation, planning module 270 may comprise a demand planner that generates a demand forecast for one or more supply chain entities 140. Planning module 270 may generate the demand forecast, at least in part, from predictions and may calculate factor values for one or more causal factors with residual time series corrections, received from prediction module 272. By way of a further example, planning module 270 may comprise an assortment planner and/or a segmentation planner that generates product assortments that match causal effects calculated for one or more customers or products by prediction module 272, which may provide for increased customer satisfaction and sales, as well as reducing costs for shipping and stocking products at stores where they are unlikely to sell.

Prediction module 272 of planning and execution system 130 applies samples of transaction data 280, supply chain data 282, product data 284, inventory data 286, store data 290, customer data 292, demand forecasts 294, and/or other data to prediction models 298 to generate predictions and calculate factor values for one or more causal factors. As disclosed above in connection with prediction module 218 of forecasting system 110, prediction module 272 of planning and execution system 130 predicts a volume Y (target or label) from a set of causal factors X along with causal factors strengths that describe the strength of each causal factor variable contributing to the predicted volume, with residual time series corrections applied using autocorrelated target and predicted time series data. According to some embodiments, prediction module 272 generates predictions at daily intervals. However, embodiments contemplate longer and shorter prediction phases that may be performed, for example, weekly, twice a week, twice a day, hourly, or the like.

Transaction data 280 of planning and execution system 130 database 134 may comprise recorded sales and returns transactions and related data, including, for example, a transaction identification, time and date stamp, channel identification (such as stores or online touchpoints), product identification, actual cost, selling price, sales volume, customer identification, promotions, and or the like. In addition, transaction data 280 is represented by any suitable combination of values and dimensions, aggregated or unaggregated, such as, for example, sales per week, sales per week per location, sales per day, sales per day per season, or the like.

Supply chain data 282 may comprise any data of one or more supply chain entities 140 including, for example, item data, identifiers, metadata (comprising dimensions, hierarchies, levels, members, attributes, cluster information, and member attribute values), fact data (comprising measure values for combinations of members), business constraints, goals and objectives of one or more supply chain entities 140.

Product data 284 of database 134 may comprise products identified by, for example, a product identifier (such as a Stock Keeping Unit (SKU), Universal Product Code (UPC) or the like), and one or more attributes and attribute types associated with the product ID. Product data 284 may comprise data about one or more products organized and sortable by, for example, product attributes, attribute values, product identification, sales volume, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, color, and the like).

Inventory data 286 of database 134 may comprise any data relating to current or projected inventory quantities or states, order rules, or the like. For example, inventory data 286 may comprise the current level of inventory for each item at one or more stocking points across supply chain network 100. In addition, inventory data 286 may comprise order rules that describe one or more rules or limits on setting an inventory policy, including, but not limited to, a minimum order volume, a maximum order volume, a discount, and a step-size order volume, and batch quantity rules. According to some embodiments, planning and execution system 130 accesses and stores inventory data 286 in database 134, which may be used by planning and execution system 130 to place orders, set inventory levels at one or more stocking points, initiate manufacturing of one or more components, or the like in response to, and based at least in part on, a forecasted demand of forecasting system 110.

Inventory policies 288 of database 134 may comprise any suitable inventory policy describing the reorder point and target quantity, or other inventory policy parameters that set rules for forecasting system 110 and/or planning and execution system 130 to manage and reorder inventory. Inventory policies 288 may be based on target service level, demand, cost, fill rate, or the like. According to embodiments, inventory policies 288 comprise target service levels that ensure that a service level of one or more supply chain entities 140 is met with a certain probability. For example, one or more supply chain entities 140 may set a service level at 95%, meaning supply chain entities 140 will set the desired inventory stock level at a level that meets demand 95% of the time. Although a particular service level target and percentage is described, embodiments contemplate any service target or level, such as, for example, a service level of approximately 99%, a 75% service level, or any suitable service level, according to particular needs. Other types of service levels associated with inventory quantity or order quantity may comprise, but are not limited to, a maximum expected backlog and a fulfillment level. Once the service level is set, forecasting system 110 and/or planning and execution system 130 may determine a replenishment order according to one or more replenishment rules, which, among other things, indicates to one or more supply chain entities 140 to determine or receive inventory to replace the depleted inventory. By way of example only and not by way of limitation, an inventory policy for non-perishable goods with linear holding and shorting costs comprises a min./max. (s, S) inventory policy. Other inventory policies 288 may be used for perishable goods, such as fruit, vegetables, dairy, fresh meat, as well as electronics, fashion, and similar items for which demand drops significantly after a next generation of electronic devices or a new season of fashion is released.

Store data 290 may comprise data describing the stores of one or more retailers and related store information. Store data 290 may comprise, for example, a store ID, store description, store location details, store location climate, store type, store opening date, lifestyle, store area (expressed in, for example, square feet, square meters, or other suitable measurement), latitude, longitude, and other similar data.

Customer data 292 may comprise customer identity information, including, for example, customer relationship management data, loyalty programs, and mappings between product purchases and one or more customers so that a customer associated with a transaction may be identified. Customer data 292 may comprise data relating customer purchases to one or more products, geographical regions, store locations, or other types of dimensions.

Demand forecasts 294 of database 134 may indicate future expected demand based on, for example, any data relating to past sales, past demand, purchase data, promotions, events, or the like of one or more supply chain entities 140. Demand forecasts 294 may cover a time interval such as, for example, by the minute, hour, daily, weekly, monthly, quarterly, yearly, or any other suitable time interval, including substantially in real time. As an example only and not by way of limitation, demand in supply chain may be modeled as a negative binomial or Poisson-Gamma distribution at the retailer level. According to other embodiments, the model also takes into account shelf-life of perishable goods (which may range from days (e.g., fresh fish or meat) to weeks (e.g., butter) or even months, before any unsold items have to be written off as waste) as well as influences from promotions, price changes, rebates, coupons, and even cannibalization effects within an assortment range. In addition, customer behavior is not uniform but varies throughout the week and is influenced by seasonal effects and the local weather, as well as many other contributing factors. Accordingly, even when demand generally follows a Poisson-Gamma model at the retailer level, the exact values of the parameters of the model may be specific to a single product to be sold on a specific day in a specific location or sales channel and may depend on a wide range of frequently changing influencing causal factors. As an example, only and not by way of limitation, an exemplary supermarket may stock twenty thousand items at one thousand locations. If each location of this exemplary supermarket is open every day of the year, planning and execution system 130 comprising a demand planner would need to calculate approximately 20,0000*1000=2×10^7 demand forecasts 294 each day to derive the optimal order volume for the next delivery cycle (e.g., three days).

Supply chain models 296 of database 134 comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). However, supply chain models 296 may also comprise characteristics that specify the supply chain structure in even more detail, including, for example, specifying the type of collaboration with the customer (e.g., Vendor-Managed Inventory (VMI)), from where products may be sourced, and how products may be allocated, shipped, or paid for, by particular customers. Each of these characteristics may lead to a different supply chain model. As an example, only and not by way of limitation, prediction models 298 comprise one or more of trained models 238 used by planning and execution system 130 for predicting a retail volume, such as, for example, a forecasted demand volume for one or more items at one or more stores of one or more retailers.

Figure 3:
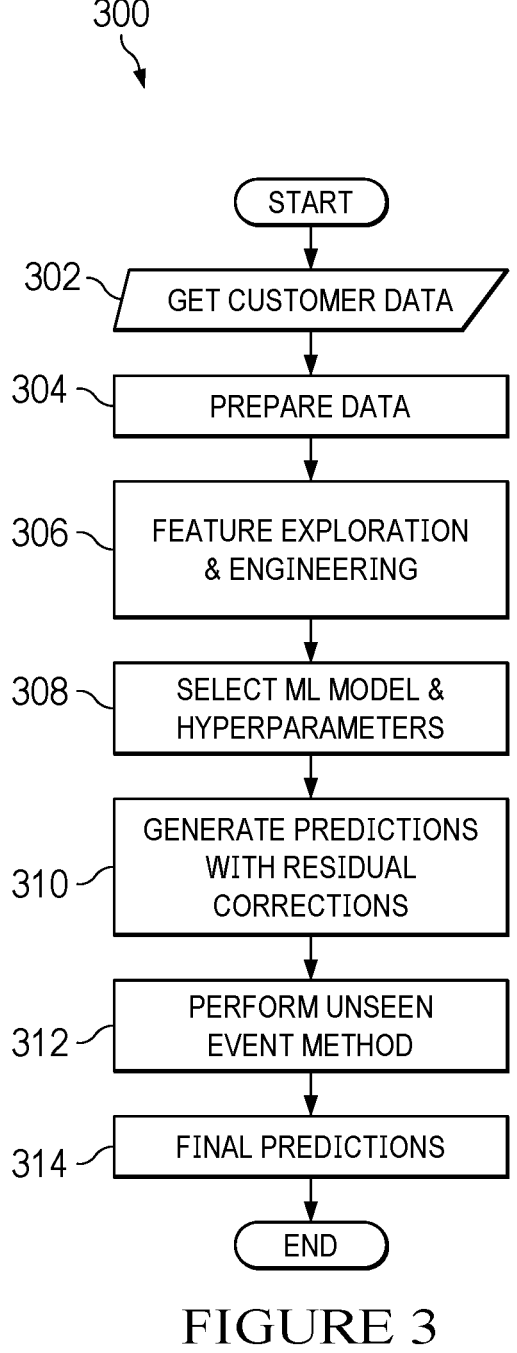
FIG. 3 illustrates demand prediction method, according to an embodiment.

FIG. 3 illustrates an exemplary demand prediction method 300 of predicting demand using domain and entity-specific knowledge base data and a machine learning algorithm with residual correction, in accordance with an embodiment. Demand prediction method 300 proceeds by one or more activities, which although described in a particular order, may be performed in one or more permutations, according to particular needs.

At activity 302 of demand prediction method 300, a supply chain problem with relevant information, for example historical data, features, horizon, granularity and other relevant data/information, may be collected from a customer and loaded into historical supply chain data 250 of archiving system 120 and/or database 134 of planning and execution system 130.

At activity 304 of demand prediction method 300, data preparation module 202 of forecasting system 110 server 112 prepares data for use in generating demand predictions for one or more products at one or more locations at given supply chain entities 140. Data preparation module 202 transfers knowledge base data, historical supply chain data 250 from archiving system 120, and/or transaction data 280, supply chain data, product data 284, inventory data 286, store data 290, and/or customer data 292 from planning and execution system 130, into training data 230 of forecasting system 110 database 114. In other embodiments, data retrieval module 250 of archiving system 120 may transfer historical supply chain data 250 from archiving system 120 to training data 230 of forecasting system 110 database 114. According to an embodiment, user interface module 220 may provide a list of sample input variables, sample input variable definitions, and sample input variable sequences, which may be selected by a user on a user interface visualization. In addition, embodiments of user interface module 220 may provide a visualization comprising graphical elements that provide selection or input of an item-store-day combination (or any other demand forecasting unit with a time dimension (DFU-time)). In response to selection or input of a DFU-time, forecasting system 110 may identify or retrieve the causal factors affecting a demand forecast or other prediction of the DFU-time.

Data preparation module 202 may prepare some or all of training data 230 for use by one or more machine learning models in predicting demand for one or more products at one or more supply chain entities 140. In an embodiment, data preparation module 202 prepares data for use in training and prediction by checking received data for errors and transforming the received data. Data preparation module 202 may check data for errors in the range, sign, and/or value and use statistical analysis to check the quality or the correctness of the data. Data preparation module 202 may also normalize data, drop or delete null values, corrupted values, or blank values, and/or may otherwise prepare the data for use in forecasting system 110. According to embodiments, data preparation module 202 transforms data to normalize, aggregate, and/or rescale the data to allow direct comparison of received data from planning and execution systems 130. Data preparation module 202 then stores prepared data in prepared data 240 of database 114.

At activity 306 of demand prediction method 300, feature engineering and feature selection module 206 explores the relevant features, finds whether given features are important and engineers new relevant features. By way of example only and not by way of limitation, in an embodiment in which forecasting system 110 predicts demand for laptop computers, feature engineering and feature selection module 206 may select the existing data columns as feature like product price, product family, product location, and the like. Embodiments of feature engineering and feature selection module 206 may create and try new features like weather features (temperature, humidity), price elasticity, events (local, global), holidays, week of year, and the like, according to particular needs. Feature engineering and feature selection module 206 may store the list of important and relevant features for the given supply chain problem.

At activity 308 of demand prediction method 300, model and hyperparameter selection module 210 selects a machine learning model and tunes hyperparameters for the machine learning model, to predict demand based on the selected features in prepared data 240. In an embodiment, model and hyperparameter selection module 210 access the selected features, in prepared data 240, and uses the selected features in prepared data 240 to choose one or more machine learning algorithms and hyperparameters to predict demand. Model and hyperparameter selection module 210 stores the selection of machine learning models and hyperparameters in prepared data 240.

At activity 310 of demand prediction method 300, prediction module 218 generates a demand prediction with residual correction and explainable causals. Prediction module 218 may access training data 230 and/or prepared data 240, including but not limited to the features, selection of machine learning models, and selection of hyperparameters stored therein. Prediction module 218 applies prepared data 240, including but not limited to the selected features to the selected machine learning model and tuned hyperparameters and the machine learning model generates a demand prediction. Prediction module 218 stores the demand prediction in predictions data 242. Prediction module 218 may apply prepared data 240 to one or more trained models 238 to generate one or more target variable predictions and may also generate a prediction with an explanation of the strength with which each of the one or more causal factors and/or the residual time series corrections influences the prediction. Having generated one or more target variable predictions, prediction module 218 stores the target variable predictions in predictions data 242. In an embodiment, user interface module 220 displays interactive graphical elements providing for modifying future states of the one or more identified causal factors and/or residual time series corrections, and, in response to modifying the one or more future states of the causal factors and/or residual time series corrections, modifying input values to represent a future scenario corresponding to the modified futures states of the one or more causal factors and/or residual time series corrections.

At activity 312 of demand prediction method 300, forecasting system 110 performs the activities of an unseen event method 400, illustrated and described in greater detail below with respect to FIG. 4, to detect an unseen event and to modify demand predictions to take into account the unseen events.

At activity 314 of demand prediction method 300, the final prediction module 218 provides the predictions to the customer using one or more GUI visualization and/or a pre-determined format. In one embodiment, GUI visualization generated by final prediction module 218 comprises individuals causals lists and their relative strength in predictions. Forecasting system 110 then terminates demand prediction method 300.

Figure 4:
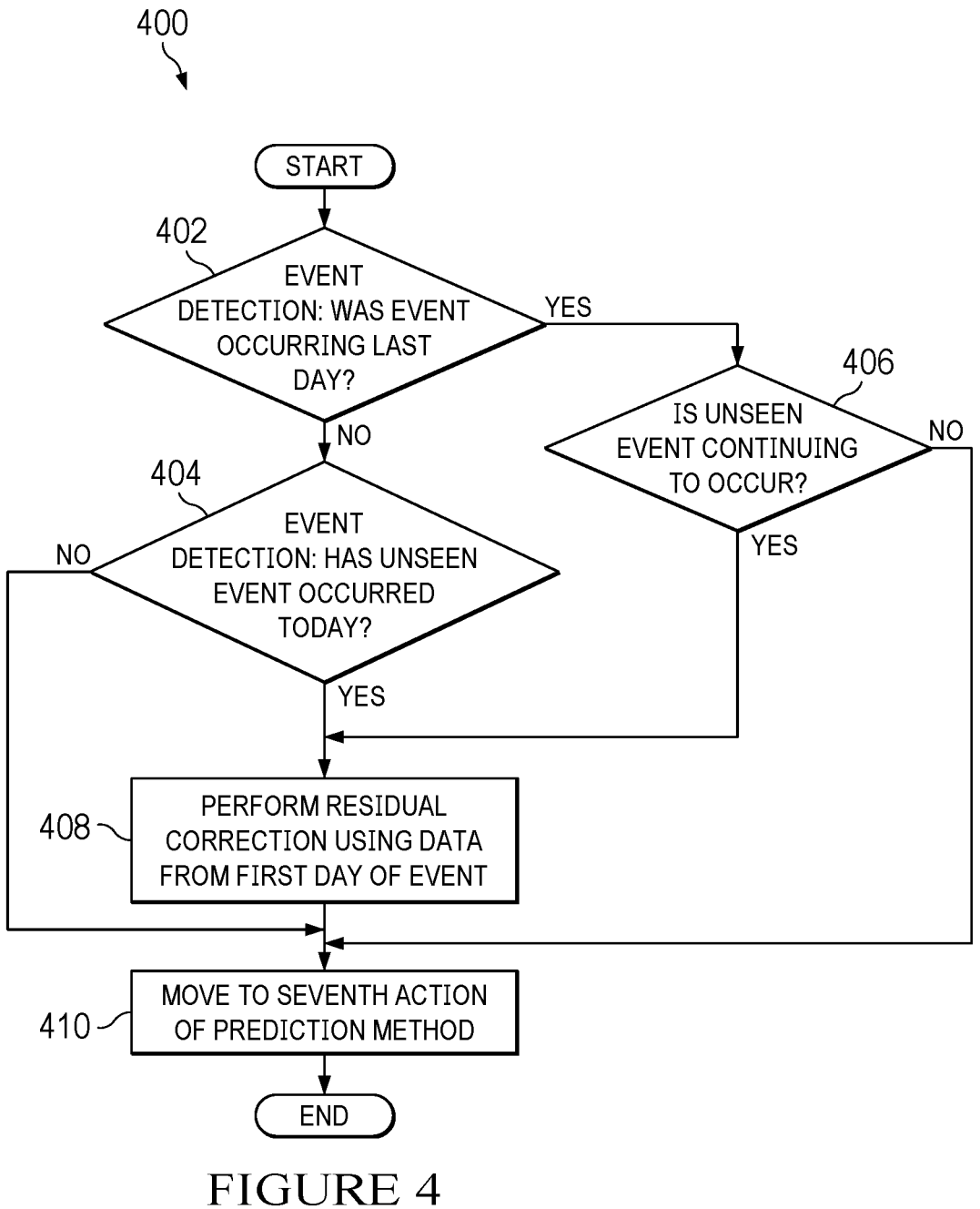
FIG. 4 illustrates an unseen event method, according to an embodiment.

FIG. 4 illustrates unseen event method 400, according to an embodiment. Unseen event method 400 proceeds by one or more activities, which although described in a particular order, may be performed in one or more permutations, according to particular needs.

According to embodiments, unseen event method 400 detects an unseen event using unseen event detection trigger data 244 and modifies demand predictions of predictions data 242 to take into account the unseen event. In the following example of unseen event method 400, the granularity of data has been taken as daily and it is assumed that, each day, the prediction is generated for the next day, which may be generated for any granularity and any horizon, according to particular needs. When embodiments of unseen event method 400 comprise different horizons, event detection module 222 checks the event on the last granular time for which the prediction was provided or which is visible to event detection module 222.

At activity 402 of unseen event method 400, event detection module 222 determines whether an unseen event was occurring the last day (or the last granular time provided). In one embodiment, event detection module 222 checks for the unseen event flag whose value will be one or zero based, at least in part, on whether an event occurred on a day (one) or not (zero). Event detection module 222 may store event flag in database 114 and will retrieve the event flag to utilize for the next day (or granular period). Event detection module

222 may access the one or more target variable predictions in predictions data 242, as well as training data 230 and/or other historical sales data stored in forecasting system 110 database 114, and one or more unseen event detection triggers stored in unseen event detection triggers data 244. According to embodiments, unseen event detection triggers of unseen event detection triggers data 244 may comprise any condition, trigger, alert, threshold value, and/or other data with respect to any component of supply chain network 100, supply chain entities 140, and/or the target variable predictions that indicates an unseen event has occurred. When event detection module 222 determines that no unseen event has occurred on the last granular period according to the unseen event detection triggers, forecasting system 110 moves to activity 404 of unseen event method 400. When event detection module 222 determines that one or more unseen event detection triggers have been found on the last granular period, forecasting system 110 moves to activity 406 of unseen event method 400.

At activity 404 of unseen event method 400, event detection module 222 determines whether unseen event has occurred on the current day and updates the unseen event flag accordingly in database 114 (e.g., the flag is set as one when an event occurs on the current day, otherwise the flag is set as zero, as disclosed above). Event detection module 222 may access the one or more target variable predictions in predictions data 242, as well as training data 230 and/or other historical sales data stored in forecasting system 110 database 114, and one or more unseen event detection triggers stored in the unseen event detection triggers data. When event detection module 222 determines that no unseen event has occurred on the current day according to the unseen event detection triggers, forecasting system 110 moves to activity 410 of unseen event method 400. When event detection module 222 determines that one or more unseen event detection triggers have been satisfied, forecasting system 110 moves to activity 408 of unseen event method 400.

At activity 406 of unseen event method 400, event detection module 222 determines whether the unseen event is continuing to occur on the current day or the recent forecasting granularity period and updates the unseen event flag accordingly in database 114. Event detection module 222 may access the one or more target variable predictions in predictions data 242, as well as training data 230, knowledge base data, and/or other historical sales data stored in forecasting system 110 database 114, and one or more unseen event detection triggers stored in the unseen event detection triggers data. According to embodiments, unseen event detection triggers may also comprise any condition, trigger, alert, threshold value, and/or other data with respect to any component of supply chain network 100, supply chain entities 140, and/or the target variable predictions that indicates the unseen event has concluded. For example, in an embodiment, an unseen event detection trigger may specify that if there is a 4% or more increase in a target variable prediction and/or historical data for a given day with respect to previous target variable predictions and/or historical data for previous days, an unseen event has concluded. According to embodiments, unseen event detection triggers may specify different conditions, triggers, alerts, threshold values, and/or other data to detect the occurrence and conclusion of a particular unseen event (for example, in an embodiment, a 10% drop in item sales over a single day may indicate the start of a pandemic, and either (1) a steady 1% increase in item sales day-over-day for 10 days, or (2) a return to pre-pandemic sales levels, may indicate the eventual conclusion of the pandemic). When an event continues to occur, forecasting system 110 moves to activity 408 of unseen event method 400. When an event does not continue to occur, forecasting system 110 moves to activity 410 of unseen event method 400.

At activity 408 of unseen event method 400, prediction module 218 generates a revised demand prediction using the extra residual correction with historical data, including but not limited to training data 230, beginning with the first day of the unseen event. In an embodiment, by performing a separate residual correction activity using only historical data collected from the start of the unseen event, forecasting system 110 provides temporary trend correction to address the effect of the unseen event on historical data and predictions based on the historical data. Residual correction module 216 stores the revised demand prediction, residually corrected for the unseen event, in predictions data 242. The idea of using extra residual correction activity is that it will correct the predictions by taking effect of the event on sales or orders and so doing local temporal correction while the first residual correction was just correcting the predictions by taking model's residuals without any unseen event effect. As an event will start giving effect from the first day, unseen event method 400 does the residual correction starting from the first day when the event is starting. Embodiments contemplate event detection module skipping the extra residual correction activity when the event concludes.

At activity 410 of unseen event method 400, forecasting system 110 moves to activity 314 of demand prediction method 300, terminates unseen event method 400, and continues the activities of demand prediction method 300.

To illustrate the operation of forecasting system 110 executing the activities of demand prediction method 300 and unseen event method 400, the following example is provided. In the following example, forecasting system 110 is required to predict demand for Jun. 1, 2021, for new hardware power tools. Although particular examples of forecasting system 110 executing the activities of the above-described methods are described herein, embodiments contemplate forecasting system 110 executing the activities of the methods to predict demand for any products and locations across any domains, supply chain entities 140, features, horizons, levels of granularity, and/or other data, according to particular needs.

In this example, at activity 302 of demand prediction method 300, forecasting system 110 may retrieve historical data, features, horizon, granularity and other relevant data required to predict demand for new hardware power tools.

In this example, at activity 304 of demand prediction method 300, data preparation module 202 of forecasting system 110 server 112 prepares data for use in generating demand predictions for the hardware power tools. Data preparation module 202 transfers historical supply chain data 250 from archiving system 120, and/or transaction data 280, supply chain data 282, product data 284, inventory data 286, store data 290, and/or customer data 292 from planning and execution system 130, into training data 230 of forecasting system 110 database 114. Data preparation module 202 prepares all of training data 230 for use by one or more machine learning models in predicting demand for hardware power tools. Data preparation module 202 normalizes the data, drops or deletes null values, corrupted values, or blank values, which may be utilized in forecasting system 110. Having prepared data, data preparation module 202 stores prepared data in prepared data 240 of database 114.

Continuing with this example, at activity 306 of demand prediction method 300, feature engineering and feature selection module 206 explores the relevant features, finds whether given features are important and engineers new relevant features, as disclosed above. By way of an example only and not by way of limitation, in an embodiment in which forecasting system 110 predicts demand for laptop computers, feature engineering and feature selection module 206 may select the existing data columns as features like product price, product family, product location, and the like, as disclosed above. Feature engineering and feature selection module 206 may also create and try new features like weather features (temperature, humidity), price elasticity, events (local, global), holidays, week of year, as disclosed above. Feature engineering and feature selection module 206 may store the list of important and relevant features for the given supply chain problem.

At activity 308 of demand prediction method 300 and continuing with this example, the machine learning model and hyperparameter selection module 210 selects a machine learning model and hyperparameters for the machine learning model to predict hardware power tool demand. In this example, the machine learning model and hyperparameter selection module 210 access the selected features, horizons, and levels of granularity stored in prepared data 240, and uses the selected features, horizons, and levels of granularity stored in prepared data 240 to choose a machine learning model (in this example, "Model X") and tuned hyperparameters for Model X (in this example, "Hyperparameters A, B, and C"), store in trained models 238 of forecasting system 110 database 114, to predict hardware power tools demand. Model and hyperparameter selection module 210 store the selection of Model X and Hyperparameters A, B, and C in prepared data 240.

Continuing with this example, at activity 310 of demand prediction method 300, prediction module 218 generates a demand prediction, with residual correction, for hardware power tools sold at retail store supply chain entities 140. Prediction module 218 may access training data 230 and prepared data 240, including but not limited to the selected features, horizons, levels of granularity, selection of Model X, and selection of Hyperparameters A, B, and C stored therein. Prediction module 218 applies prepared data 240, including but not limited to the selected features, horizons, and levels of granularity to Model X using Hyperparameters A, B, and C, and generates a demand prediction at the daily and weekly level, with residual correction, for hardware power tools sold at a particular retail store. Prediction module 218 stores the hardware power tools demand prediction in predictions data 242.

Continuing with this example, at activity 312 of demand prediction method 300, forecasting system 110 performs the activities of unseen event method 400 to check for the unseen event and to modify demand predictions to take into account an unseen event.

At activity 402 of unseen event method 400, event detection module 222 determines whether an unseen event was occurring the last day (or last granular time provided) by seeing the unseen event flag value stored in database 114. Event detection module 222 accesses the target variable predictions in predictions data 242, training data 230, and the unseen event detection triggers stored in the unseen event detection triggers data. In this example, one of the unseen event detection triggers specifies that the unseen event flag was not one (i.e., not 'on') for the last day (i.e., the event was not occurring last day so demand prediction method 300 moves to the second action of unseen event method 400). At activity 404 of unseen event method 400, event detection module 222 determines whether the unseen event has occurred today (i.e., the current day). In this example, one of the unseen event detection triggers specifies that if the daily observed power tools sales at a particular retail store decrease by 10% or more versus the preceding day sales or daily demand prediction, an economic downturn has occurred. In this example, event detection module 222 is forecasting for Jun. 1, 2021, and finds that the daily hardware power tools demand prediction for Jun. 1, 2021, has decreased by 11% as compared to May 31, 2021 and an economic downturn unseen event is now occurring. Continuing this example, event detection module 222 updates the unseen event flag to one and stores it in database 114 which will be used in the next day or granular period prediction.

Moving to the next activity in the current example, forecasting system 110 continues to activity 408 of unseen event method 400 when prediction module 218 generates a revised demand prediction using residual correction with historical data, including but not limited to training data 230 beginning with the first day of the unseen event (Jun. 1, 2021). In this example, the unseen event detection trigger that indicates the economic downturn has concluded comprises a full return to pre-downturn sales for the hardware power tools at the particular retail store. In this example, forecasting system 110 keeps forecasting for next day predictions each day, generating revised demand predictions using residual correction with historical data beginning with the first day of the economic downturn, until Aug. 1, 2021, on which day event detection module 222 determines that the economic downturn has concluded. At activity 410 of unseen event method 400, forecasting system 110 moves to activity 314 of demand prediction method 300, terminates unseen event method 400, and continues the activities of demand prediction method 300.

Concluding with this example, at activity 314 of demand prediction method 300, the final prediction module 218 provides the predictions to the customer using a GUI visualization generated by user interface module 220 and/or in a pre-determined format. As disclosed above, GUI visualization may comprise individual causals lists and the relative strength of the causals in the generated predictions. Forecasting system 110 then terminates demand prediction method 300.

Reference in the foregoing specification to "one embodiment", "an embodiment", or "some embodiments" means that a particular causal factor, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system comprising a computer, the computer comprising a server and configured to:

prepare data received from a supply chain domain and a supply chain entity to predict a demand associated with the supply chain domain and the supply chain entity;

select features in the prepared data and train a machine learning model associated with the supply chain domain and the supply chain entity;

generate a demand prediction with a first residual time series corrections, using the machine learning model associated with the supply chain domain and the supply chain entity, wherein the demand prediction further comprises a list of individual causal factors with a corresponding relative strength of the individual causal factors in the demand prediction;

automatically monitor the demand prediction and data from the supply chain domain and the supply chain entity to detect an occurrence of an unseen event;

in response to detecting the occurrence of the unseen event, automatically revise the demand prediction by updating the machine learning model for a duration of the event, wherein revising the demand prediction further comprises performing a second residual time series corrections using the machine learning model, wherein the second residual time series corrections incorporates time information associated with the unseen event; and initiate manufacturing of one or more components based, at least in part on, the revised demand prediction.

2. The system of claim 1, wherein detecting the occurrence of the unseen event further comprises detecting that a greater than threshold increase has occurred in a prediction of a target variable of the machine learning model.

3. The system of claim 2, wherein the revised demand prediction further comprises the first residual time series correction and the second residual time series correction, the second residual time series correction being applied only during a time span of the unseen event.

4. The system of claim 1, wherein the unseen event comprises an unseen event for which the machine learning model has not previously been trained to predict demand.

5. The system of claim 1, wherein the selected features are one or more selected from a group consisting of:

product price, product family, product location, weather, price elasticity, a local event, a global event, a holiday and a week of a year.

6. The system of claim 1, wherein the server is further configured to prepare the data received by performing at least one of:

normalizing the data, dropping or deleting null values, dropping or deleting corrupted values, or dropping or deleting blank values.

7. A computer-implemented method, comprising preparing, by a server, data received from a supply chain domain and a supply chain entity to predict a demand associated with the supply chain domain and the supply chain entity;

selecting, by the server, features in the prepared data and training a machine learning model associated with the supply chain domain and the supply chain entity;

generating, by the server, a demand prediction with a first residual time series corrections, using the machine learning model associated with the supply chain domain and the supply chain entity, wherein the demand prediction further comprises a list of individual causal factors with a corresponding relative strength of the individual causal factors in the demand prediction;

automatically monitoring, by the server, the demand prediction and data from the supply chain domain and the supply chain entity to detect an occurrence of an unseen event;

in response to detecting the occurrence of the unseen event, automatically revising, by the server, the demand prediction by updating the machine learning model for a duration of the event, wherein revising the demand prediction further comprises performing, by the server, a second residual time series corrections using the machine learning model, wherein the second residual time series corrections incorporates time information associated with the unseen event; and initiating, by the server, manufacturing of one or more components based, at least in part on, the revised demand prediction.

8. The computer-implemented method of claim 7, wherein detecting the occurrence of the unseen event further comprises detecting, by the server, that a greater than threshold increase has occurred in a prediction of a target variable of the machine learning model.

9. The computer-implemented method of claim 8, wherein the revised demand prediction further comprises the first residual time series correction and the second residual time series correction, the second residual time series correction being applied only during a time span of the unseen event.

10. The computer-implemented method of claim 7, wherein the unseen event comprises an unseen event for which the machine learning model has not previously been trained to predict demand.

11. The computer-implemented method of claim 7, wherein the selected features are one or more selected from a group consisting of:

product price, product family, product location, weather, price elasticity, a local event, a global event, a holiday and a week of a year.

12. The computer-implemented method of claim 7, further comprising preparing, by the server, the data received by performing at least one of:

normalizing the data, dropping or deleting null values, dropping or deleting corrupted values, or dropping or deleting blank values.

13. A non-transitory computer-readable storage medium embodied with software, the software when executed:

prepares, by a server, data received from a supply chain domain and a supply chain entity to predict a demand associated with the supply chain domain and the supply chain entity;

selects features in the prepared data and trains a machine learning model associated with the supply chain domain and the supply chain entity;

generates a demand prediction with a first residual time series corrections, using the machine learning model associated with the supply chain domain and the supply chain entity, wherein the demand prediction further comprises a list of individual causal factors with a corresponding relative strength of the individual causal factors in the demand prediction;

automatically monitors the demand prediction and data from the supply chain domain and the supply chain entity to detect an occurrence of an unseen event;

in response to detecting the occurrence of the unseen event, automatically revises the demand prediction by updating the machine learning model for a duration of the event, wherein the software when executed revises the demand prediction further by performing a second residual time series corrections using the machine learning model, wherein the second residual time series corrections incorporates time information associated with the unseen event; and initiates manufacturing of one or more components based, at least in part on, the revised demand prediction.

14. The non-transitory computer-readable storage medium of claim 13, wherein the software when executed detects the occurrence of the unseen event further by detecting that a greater than threshold increase has occurred in a prediction of a target variable of the machine learning model.

15. The non-transitory computer-readable storage medium of claim 14, wherein the revised demand prediction further comprises the first residual time series correction and the second residual time series correction, the second residual time series correction being applied only during a time span of the unseen event.

16. The non-transitory computer-readable storage medium of claim 13, wherein the unseen event comprises an unseen event for which the machine learning model has not previously been trained to predict demand.

17. The non-transitory computer-readable storage medium of claim 13, wherein the selected features are one or more selected from a group consisting of:

product price, product family, product location, weather, price elasticity, a local event, a global event, a holiday and a week of a year.

*   *   *   *   *